United States Patent
Park

(10) Patent No.: US 6,865,590 B2
(45) Date of Patent: Mar. 8, 2005

(54) THREE INPUT VARIABLE SUBFIELD COMPARATION FOR FAST MATCHING

(75) Inventor: Heonchul Park, Cupertino, CA (US)

(73) Assignee: Infineon Technologies AG, Munich (DE)

( * ) Notice: Subject to any disclaimer, the term of this patent is extended or adjusted under 35 U.S.C. 154(b) by 646 days.

(21) Appl. No.: 10/014,098

(22) Filed: Dec. 10, 2001

(65) Prior Publication Data

US 2003/0110198 A1 Jun. 12, 2003

(51) Int. Cl.⁷ .................................. G06F 7/50
(52) U.S. Cl. ...................... 708/671; 708/709
(58) Field of Search .................. 708/671, 706, 708/708, 709; 340/146.2

(56) References Cited

U.S. PATENT DOCUMENTS

| | | | | |
|---|---|---|---|---|
| 5,144,577 A | * | 9/1992 | Linnenberg | 708/671 |
| 5,923,579 A | * | 7/1999 | Widigen et al. | 708/706 |
| 6,292,818 B1 | * | 9/2001 | Winters | 708/671 |
| 6,466,960 B1 | * | 10/2002 | Winters | 708/671 |

* cited by examiner

*Primary Examiner*—Chuong Ngo
(74) *Attorney, Agent, or Firm*—Bever, Hoffman & Harms, LLP; Edward S. Mao

(57) ABSTRACT

The relationship between a sum of applied address operands and a matching virtual page number is exploited to minimize the adder size required for fast number comparison. In one embodiment, variably-sized addresses are accommodated by augmenting a portion of the applied address operands to ensure easy access to potential carry bits. A comparator is used for each virtual page number stored in a translation look-aside buffer to quickly determine whether that virtual page number matches the applied address operand sum.

36 Claims, 6 Drawing Sheets

THREE INPUT VARIABLE SUBFIELD COMPARATION FOR FAST MATCHING

FIELD OF THE INVENTION

The present invention relates to memory management units, and more particularly to a method and apparatus for performing fast address comparison.

BACKGROUND OF THE INVENTION

Modern computer systems allow multiple processes (e.g. software programs) to run simultaneously on a central processing unit (CPU). These processes store and retrieve information from memory within the computer system. This memory is accessed by means of a physical address, i.e., an absolute coordinate system by which individual memory locations are identified. In the interests of efficient memory allocation and for the ease of software design, individual processes are not allocated the physical addresses of the physical memory. Rather, individual processes are allocated a virtual address representing the portion of the memory resources which are available to that process. The total allocated virtual addresses (the virtual address space) may represent a larger space than the actual physical memory, allowing individual processes to operate as if more memory than the actual physical memory is present in the computer system.

A memory management unit (MMU) mediates between the virtually addressed memory accesses requested by each process and the physical addresses of the available physical memory storing the desired data. An MMU is a device or circuit that supports virtual memory and paging by translating virtual addresses into physical addresses. Each process running in a system with an MMU receives a portion of a virtual address space. Typically, the virtual address space is divided into pages of $2^N$ bits each, each process receiving a number of pages. Each virtual address accessed by a process running on the CPU is split into a virtual page number (VPN), comprising the most significant bits of the virtual address, and an offset within that page, comprising the N least significant bits of the virtual address. Thus, if an address is 32 bits and a page size is 4 KB ($2^N=2^{12}$), then the page offset is defined as the rightmost (least significant) 12 bits (N) of the address and the virtual page number is defined as the remaining (most significant) 20 bits in the 32 bit virtual address.

The MMU contains a page table that is indexed by the virtual page number. While the offset is left unchanged by the MMU, the virtual page number is mapped through the page table to a physical page number (PPN). Each page table entry (PTE) has a stored virtual page number and a corresponding physical page number. The page table provides a physical page number corresponding to a stored virtual page number matching an applied virtual page number. This physical page number is recombined with the page offset to create a physical address, which is an actual location in physical memory (e.g. RAM). For example, with an 8 bit address and a 4 bit ($2^2$) page size, the most significant 4 bits of a virtual address are the virtual page number and the least significant 4 bits are the page offset. A particular process generates a first address including a first virtual page number, which is applied to a page table of an MMU. Through the page table lookup, the MMU determines a first physical page number from the virtual page number for the particular process. The page offset (least significant 4 bits) is combined with this first physical page number to generate a physical address of a location in memory.

To save time in translating virtual page numbers to physical page numbers, the most recently used page translations may be cached in a translation look-aside buffer (TLB). Translation look-aside buffers typically have an associative memory, with comparators for each word, so that the translation can be retrieved in one clock cycle. If the virtual page number is not found in the translation look-aside buffer, then the MMU page table is checked for the virtual page number. A typical translation look-aside buffer has four cached page translations. For some applications, a virtual address is calculated from the sum of two operands. As a result, the translation of a virtual address to a physical address first requires calculation of the virtual page number from the most significant bits of the sum of the two operands, and then requires translation by a translation look-aside buffer or page table to a physical address.

FIG. 1 is a block diagram of a conventional system 100 for the calculation of a physical address from two 32 bit operands. An adder 110 receives a first 32 bit operand OPA and a second 32 bit operand OPB, combining them to form a virtual page number VPN_IN and a page offset PO. A translation look-aside buffer 120 includes four rows and two columns, each row in the first column storing a virtual page number (e.g. VPNs 130, 131, 132, and 133) and the corresponding row in the second column storing a physical page number (e.g. PPNs 140, 141, 142, and 143). For example, the first row in translation look-aside buffer 120 contains a virtual page number 130 and a corresponding physical page number 140. Thus, translation look-aside buffer 120 maps an applied virtual page number matching virtual page number 130 to a physical page number physical page number 140. In this example, translation look-aside buffer 120 provides matching physical page number 140 as a physical page number PPN_OUT.

The page offset PO generated from the sum of operands OPA and OPB is concatenated with physical page number PPN_OUT to generate a physical address. Specifically, translation look-aside buffer 120 receives virtual page number VPN_IN and compares virtual page number VPN_IN to each of VPNs 130, 131, 132, and 133. If virtual page number VPN_IN matches one of VPNs 130–133, translation look-aside buffer 120 provides the corresponding one of PPNs 140, 141, 142, and 143 as PPN_OUT. A concatenator 115 combines page offset PO with physical page number PPN_OUT to generate the physical address PA.

The process of adding 32 bit numbers and then applying them to a translation look-aside buffer takes a certain amount of time. Because the addition of operands OPA and OPB (e.g. a 32 bit addition) within adder 110 occurs in a sequential fashion, the overall time taken to determine a physical address from a virtual address is delayed by the amount of time taken to complete the serial addition of the operands prior to their comparison to the cached VPNs. Additionally, adder 110, which can accommodate 32 bit operands OPA and OPB, requires a large amount of circuit area. Hence, it would be desirable to reduce the amount of time and space required to produce a physical address from a virtual address formed by two operands.

SUMMARY

Accordingly, a fast system and method for generating physical page numbers (PPNs) in accordance with one embodiment of the present invention includes exploiting a relationship between the sum of two operands and a matching virtual page number (VPN). Direct parallel application of sum and carry bits from a portion of each operand as well as a pre-stored virtual page number bit to a plurality of comparators minimizes the time required to process a sum of a large operand as well as, in some cases, reducing the circuit area required for the operation. In one embodiment, two operands generating a virtual page number with a known size are applied to a bit adder along with a pre-stored virtual page number. The sum and the logical NOT of the carry generated by the bit adder are compared to determine if a match exists between the sum of the two operands and the pre-stored virtual page number. A match indicates that the applied virtual page number matches the virtual page number stored in the page table.

In another embodiment of the present invention, a portion of two variably-sized operands generating a virtual page number are applied to a bit adder along with a pre-stored virtual page number to generate a concatenated bitwise sum and a concatenated bitwise carry. Additional portions of the two variably-sized operands are augmented with additional bits, called indicator bits, and applied to a word adder to generate a wordwise sum and a wordwise carry bit. The concatenated bitwise sum, the logical NOT of the concatenated bitwise carry, and the inverse of the wordwise carry bit are applied to a comparator to determine if a match exists between the sum of the operands and the pre-stored virtual page number. As stated above, a indicates that the applied virtual page number matches the virtual page number stored in the page table.

The present invention will be more fully understood in view of the following description and drawings.

BRIEF DESCRIPTION OF THE DRAWINGS

Similar elements in Figures are labeled similarly.

DETAILED DESCRIPTION

Figure 1:
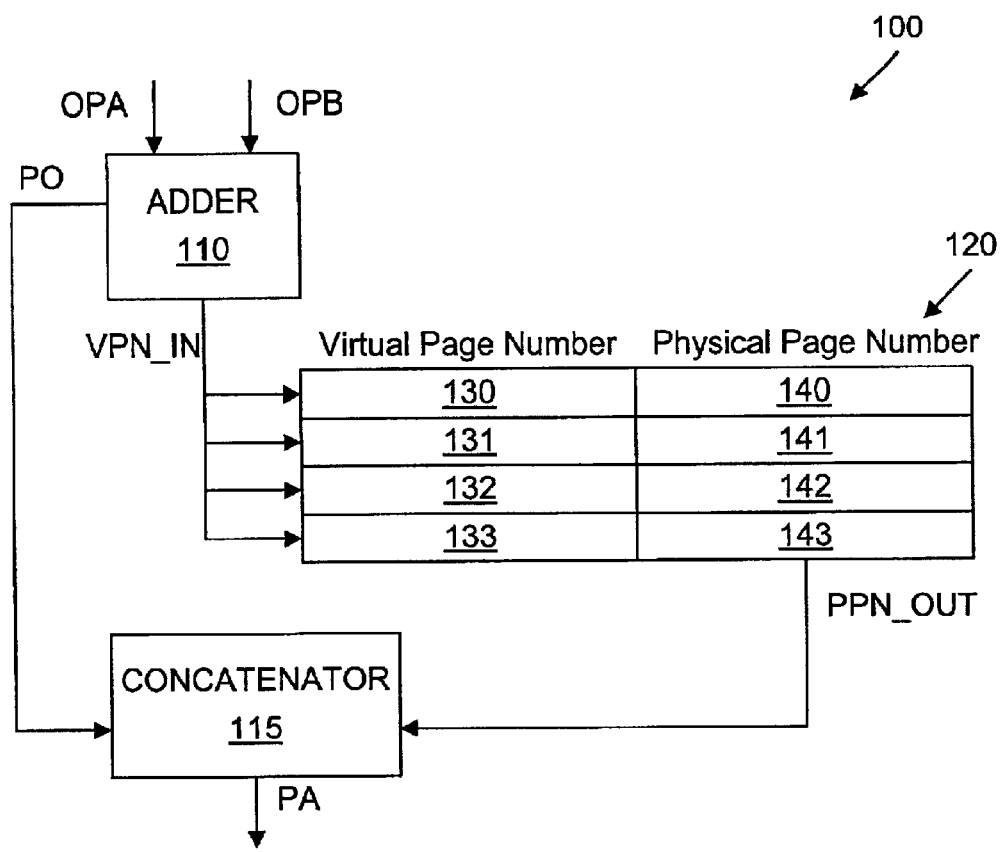
FIG. 1 is a simplified diagram of a conventional system for calculating a physical page number from two operands.

Fast access to memory is important for the satisfactory operation of computer systems. As described above, a memory management unit (MMU) conventionally provides translation of virtual addresses into physical addresses utilizing a table defining the relationship between the virtual address generated by a software process and the corresponding physical address. To increase the speed of memory accesses, the MMU provides a cache of the most recently mapped virtual addresses, called a table look-aside buffer (TLB). It is desirable to make the operations utilizing the translation look-aside buffer as fast as possible.

In one embodiment of the present invention, a compare system for accessing a translation look-aside buffer is described. In this embodiment, the relationship between two operands and their sum is exploited to decrease the time required for determining a match between an applied virtual address and a stored virtual page number. Specifically, the comparison of the sum of two operands to a matching virtual page number entry in a translation look-aside buffer is represented by Equation 1:

$$A+B=K \qquad \text{Equation 1.}$$

where A includes the most significant bits of a first operand, B includes the most significant bits of a second operand, and K is a pre-stored virtual page number from a translation look-aside buffer that matches the sum of operand portion A and operand portion B. Equation 1 may be rewritten to state:

$$A+B+(-K)=0 \qquad \text{Equation 2.}$$

In 2's compliment mathematics, the negative of a binary number is equal to the logical NOT of the number (the inversion of each bit in the number) plus 1. Equation 3 represents the 2's compliment of pre-stored virtual page number K:

$$-K=\text{NOT}(K)+1 \qquad \text{Equation 3.}$$

where $-K$ is the 2's compliment (i.e. the negative) of pre-stored virtual page number K, NOT(K) is the bit inversion (i.e. the logical NOT) of pre-stored virtual page number K, and 1 is a binary 1 padded with enough leading zeroes to match the size of pre-stored virtual page number K.

Combining Equation 2 and Equation 3 produces:

$$A+B+\text{NOT}(K)+1=0 \qquad \text{Equation 4.}$$

and moving the 1 to the right hand side of Equation 4 produces:

$$A+B+\text{NOT}(K)=-1 \qquad \text{Equation 5.}$$

The sum of three binary numbers may be represented by a bitwise concatenated sum SUM defined as the concatenation of the bitwise sum SUM(i) bits and a bitwise concatenated carry CARRY defined as the concatenation of the bitwise carry CARRY(i) bits. Sum SUM(i) and carry CARRY(i) are defined as:

$$\text{SUM}(i)=A(i) \text{ XOR } B(i) \text{ XOR NOT}(K(i)) \qquad \text{Equation 6.}$$

$$\text{CARRY}(i)=[A(i-1) \text{ AND } B(i-1)] \text{ OR } [A(i-1) \text{ AND NOT}(K(i-1))] \text{ OR } [B(i-1) \text{ AND NOT}(K(i-1))] \qquad \text{Equation 7.}$$

where i is the $i^{th}$ bit and CARRY(0) is defined as 1 (assuming A+B=K). Therefore, Equation 5 may be re-written as:

$$\text{SUM}+\text{CARRY}=-1 \qquad \text{Equation 8.}$$

which may be re-written as:

$$\text{SUM}=-1+-\text{CARRY} \qquad \text{Equation 9.}$$

The 2's compliment of carry CARRY is defined as:

$$-\text{CARRY}=\text{NOT}(\text{CARRY})+1 \qquad \text{Equation 10.}$$

which may be combined with Equation 9 to produce:

$$\text{SUM}=-1+\text{NOT}(\text{CARRY})+1 \qquad \text{Equation 11.}$$

which may be re-written as:

$$\text{SUM}=\text{NOT}(\text{CARRY}) \qquad \text{Equation 12.}$$

Thus, Equation 12 shows that if the sum of two operand portions A and B matches a pre-stored virtual page number K, then the concatenated bitwise sums of operand portion A, operand portion B, and the logical NOT of pre-stored virtual page number K will match the logical NOT of the concatenated bit carries of operand portion A, operand portion B, and the logical NOT of pre-stored virtual page number K.

Figure 2A:
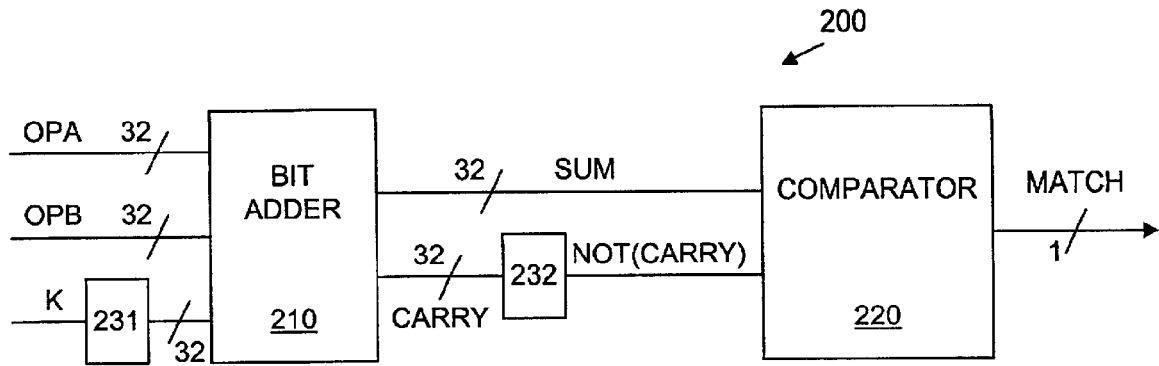
FIG. 2A is a block diagram of a compare system for an MMU in accordance with one embodiment of the present invention.

FIG. 2A is a block diagram of a compare system 200 for an MMU used to implement the principle of Equations 1 and 12 in accordance with one embodiment of the present invention. Compare system 200 includes a bit adder 210, comparator 220, and bitwise inverters 231 and 232. Bitwise inverter 231 is used to invert each bit of the pre-stored virtual page number K. Bit adder 210 performs a bitwise addition of operand OPA, operand OPB and the inverted pre-stored virtual page number K to produce a bitwise concatenated sum SUM and a bitwise concatenated carry CARRY. The bitwise addition performed by bit adder 210 is much faster than serial addition of the same operands. Bitwise inverter 231 is used to invert each bit of the bitwise concatenated carry CARRY. Comparator 220 compares each bit of bitwise concatenated sum SUM and the corresponding bit of bitwise concatenated carry NOT(CARRY) to produce a match bit MATCH.

Figure 2B:
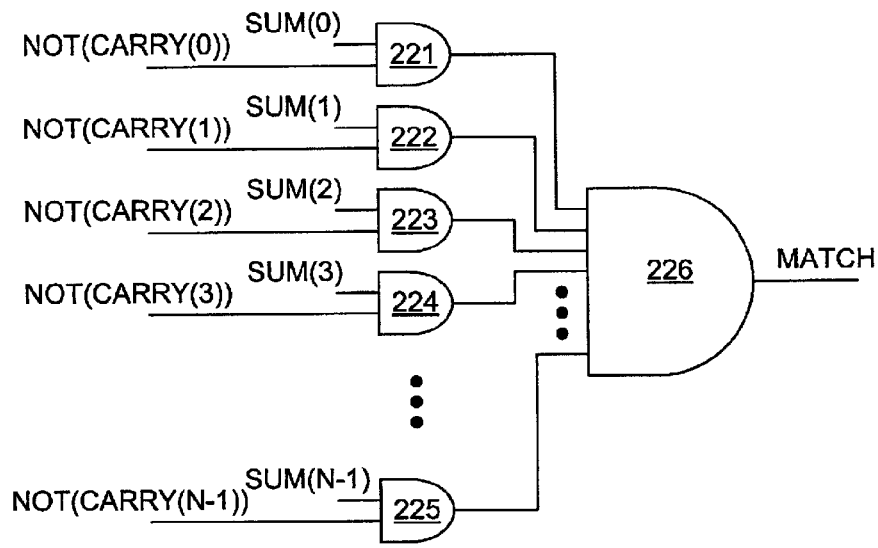
FIG. 2B is a block diagram of an AND tree comparator for an N bit address and 64K page size in accordance with one embodiment of the present invention.

In one embodiment, comparator 220 is an AND tree, wherein each bit of bitwise concatenated sum SUM and bitwise concatenated carry NOT(CARRY) applied to each corresponding first level AND gate and each first level AND gate output provided to a second level AND gate to produce the match bit MATCH. FIG. 2B is a block diagram of an AND tree comparator for a 32 bit address in accordance with one embodiment of the present invention. Each bit of bitwise concatenated sum SM is applied to an AND gate along with each corresponding bit of bitwise concatenated carry NOT(CARRY). When A+B=K, CARRY(0)=0, so NOT(CARRY(0))=1. Because N=32 (32 bit address) and the bit count starts at "0" and ends at "31", the most significant bit applied to the last first level AND gate (e.g. AND gate 225) is the $31^{st}$ bit (i.e. N-1). If each bit of bitwise concatenated sum SUM matches each bit of bitwise concatenated carry NOT(CARRY), then the output terminals of AND gates 221–225 (as well as the output terminals of AND gates not shown) provide logic "1" values to AND gate 226. Thus, match bit MATCH is equal to a logic "1" value if the sum of operands OPA and OPB is equivalent to pre-stored virtual page number K.

Figure 2C:
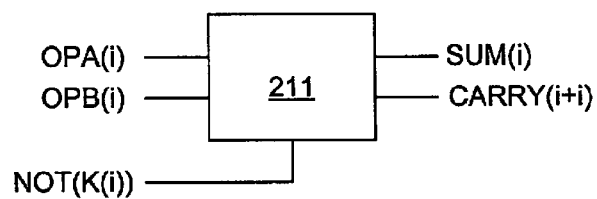
FIG. 2C is a block diagram for a one-bit adder in accordance with the embodiment of FIG. 2A.

Bit adder 210 (FIG. 2A) includes a plurality of one-bit adders. FIG. 2C is a block diagram for a one-bit adder 211 in accordance with one embodiment of the present invention. One-bit adder 211 receives operand bit OPA(i), the $i^{th}$ bit of operand OPA, operand bit OPB(i), the $i^{th}$ bit of operand OPB, and bit NOT(K(i)), the $i^{th}$ bit of inverted pre-stored virtual page number K. Bit adder produces bitwise sum bit S(i), the $i^{th}$ bit of the bitwise concatenated sum SUM, in accordance with Equation 6, and bitwise concatenated carry bit CARRY(i+1), the (i+1) bit of bitwise concatenated carry CARRY, in accordance with Equation 7.

One-bit adder 211 produces a bitwise sum bit SUM(i) and a bitwise carry bit CARRY(i) from the applied data independently of the function of other one-bit adders comprising bitwise adder 210. While the bitwise concatenated sum SUM and bitwise concatenated carry CARRY need to be further manipulated to produce a true sum (i.e. a word sum of the applied data) and a true carry (i.e. a word carry bit after generating the word sum), the bitwise concatenated sum and bitwise concatenated carry produced by bitwise adder 210 are sufficient to utilize the properties of Equations 6, 7, and 12 to determine whether a match exists between the sum of the two operands and the pre-stored virtual page number. Thus, bitwise adder 210, unlike a word adder, may perform the add of each bit of the applied data in parallel. As a result, the time required to generate an N bit concatenated sum SUM is many times faster than the time required to generate an N bit word sum.

A compare system similar to compare system 200 (FIG. 2A) is provided for each virtual page number (i.e. pre-stored virtual page number K) in the translation look-aside buffer of an MMU. Therefore, if a translation look-aside buffer has four rows, and thus stores four virtual page numbers, the MMU will have four compare systems similar to compare system 200, one for each row. If a particular compare system 200 has an output bit (i.e. match bit MATCH) equal to a logic "1" value, then the associated physical page number for that pre-stored virtual page number K is provided as the output physical page number of the translation look-aside buffer.

In another embodiment of the present invention, the page size of the MMU is used to truncate the number of bits applied to a bit adder similar to bit adder 210 of FIG. 2A. For example, in a system with 32 bit addresses, a 1K page size results in the most significant 22 bits of the address corresponding to the virtual page number and the least significant 10 bits of the address corresponding to the page offset. As a result, only the most significant 22 bits need be used for a compare system similar to compare system 200 of FIG. 2A. However, a compare system according to this embodiment requires a carry bit from the word sum of the least significant 10 bits of the address as described below.

Figure 3:
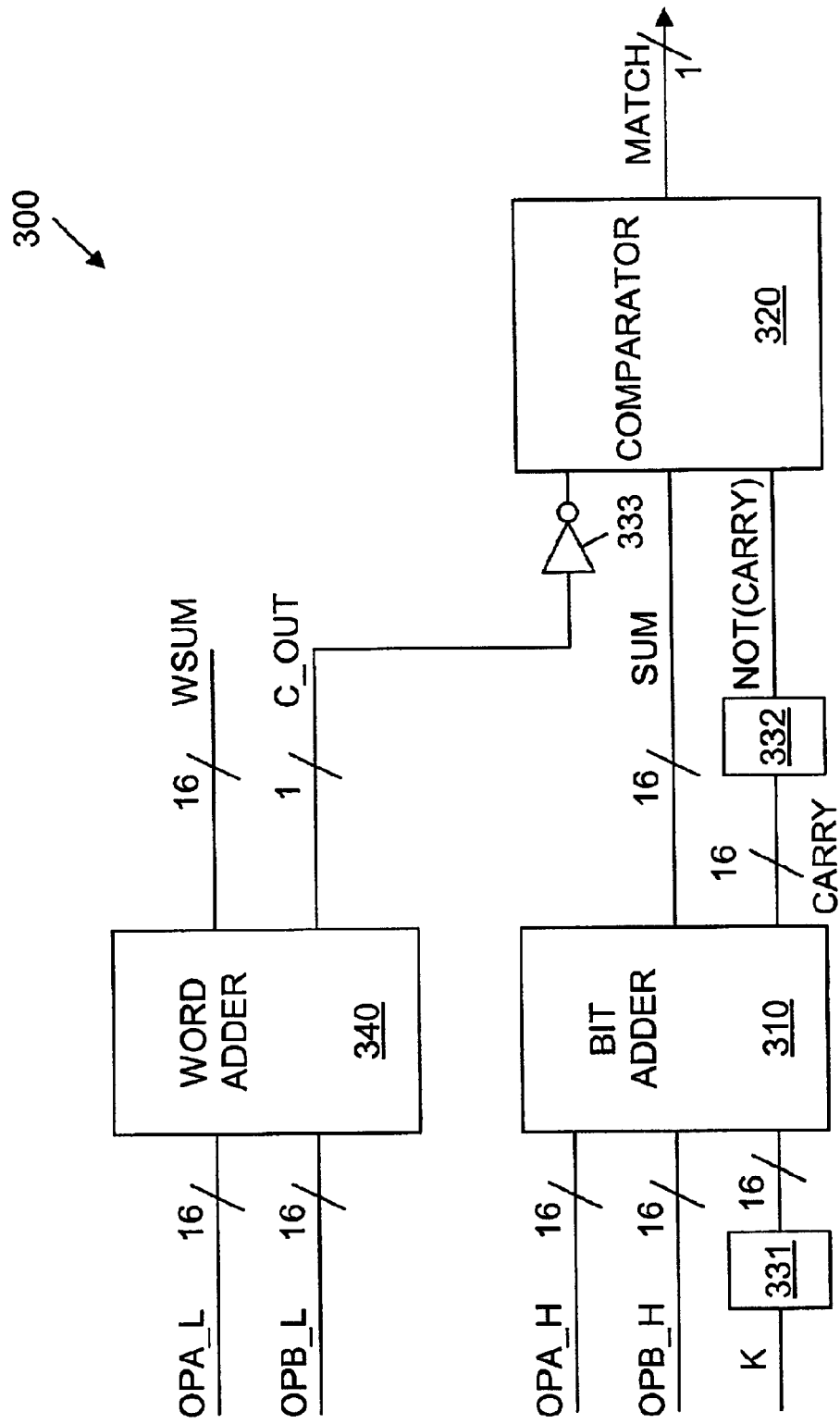
FIG. 3 is a block diagram of a compare system in accordance with another embodiment of the present invention.

FIG. 3 is a block diagram of a compare system 300 in accordance with another embodiment of the present invention. In this example of compare system 300, a 64K page size and 32 bit address is described. Thus, the virtual page number consists of the 16 most significant bits of the sum of operands OPA and OPB. For clarity, the 16 most significant bits of operand OPA are called an operand portion OPA_H and the 16 most significant bits of operand OPB are called an operand portion OPB_H. Similarly, the 16 least significant bits of operand OPA and OPB are called operand portions OPA_L and OPB_L, respectively. Compare system 300 includes bit adder 310 that receives operand portions OPA_H and OPB_H as well as a logical NOT of a pre-stored virtual page number K (through bitwise inverter 331). Bit adder 310 provides a 16 bit bitwise concatenated sum SUM and a 16 bit bitwise concatenated carry CARRY according to Equations 6 and 7, respectively.

As described above, comparator 320 receives bitwise concatenated sum SUM and the logical NOT of bitwise concatenated carry CARRY (through bitwise inverter 331). While comparing the least significant bit of bitwise concatenated sum SUM (e.g., the $0^{th}$ bit) to the opposite of the least significant bit of bitwise concatenated carry CARRY (the $0^{th}$ bit), Equation 7 shows that the $0^{th}$ bit of bitwise concatenated carry CARRY can not be calculated from the operand portions applied to bit adder 310. Therefore, comparator 320 must also receive a wordwise carry bit calculated from operand portions OPA_L and OPB_L to define this $0^{th}$ bit of bitwise concatenated carry CARRY. Operand portions OPA_L and OPB_L are applied to word adder 340. Word adder 340 generates a 16 bit wordwise sum WSUM of those operand portions as well as a wordwise carry bit C_OUT. Wordwise sum WSUM is a true sum of operand portions OPA_L and OPB_L. Wordwise carry bit C_OUT is inverted by inverter 333 and applied to comparator 320 for comparison to the $0^{th}$ bit of bitwise concatenated sum SUM. Comparator 320 generates a one bit match signal MATCH which has a logic "1" value if the virtual page number generated by the true sum of operands OPA and OPB matches the pre-stored virtual page number K, and has a logic "0" value otherwise. While compare system 300 has been described with respect to a 64K page size system and 32 bit addresses, one skilled in the art can easily adapt compare system 300 to other page sizes (e.g. a 1K, 4K, and 16K page size) and other addresses sizes (e.g. 16 bits). For example, a 16K page size and 32 bit address requires a 14 bit page offset with 18 bits of the 32 bit address left over for the virtual page number.

For some applications, for example, the page size is a selectable variable that may be defined by the software. For these types of applications, the size of the virtual page numbers vary depending on the definition of the page size variable. Thus, some embodiments of the present invention include a variable size comparison system to accommodate the variable page size. While the present embodiment is described with respect to memory management units, the principles of this embodiment may be adapted to any application utilizing comparisons of variable sized operands.

Figure 4A:
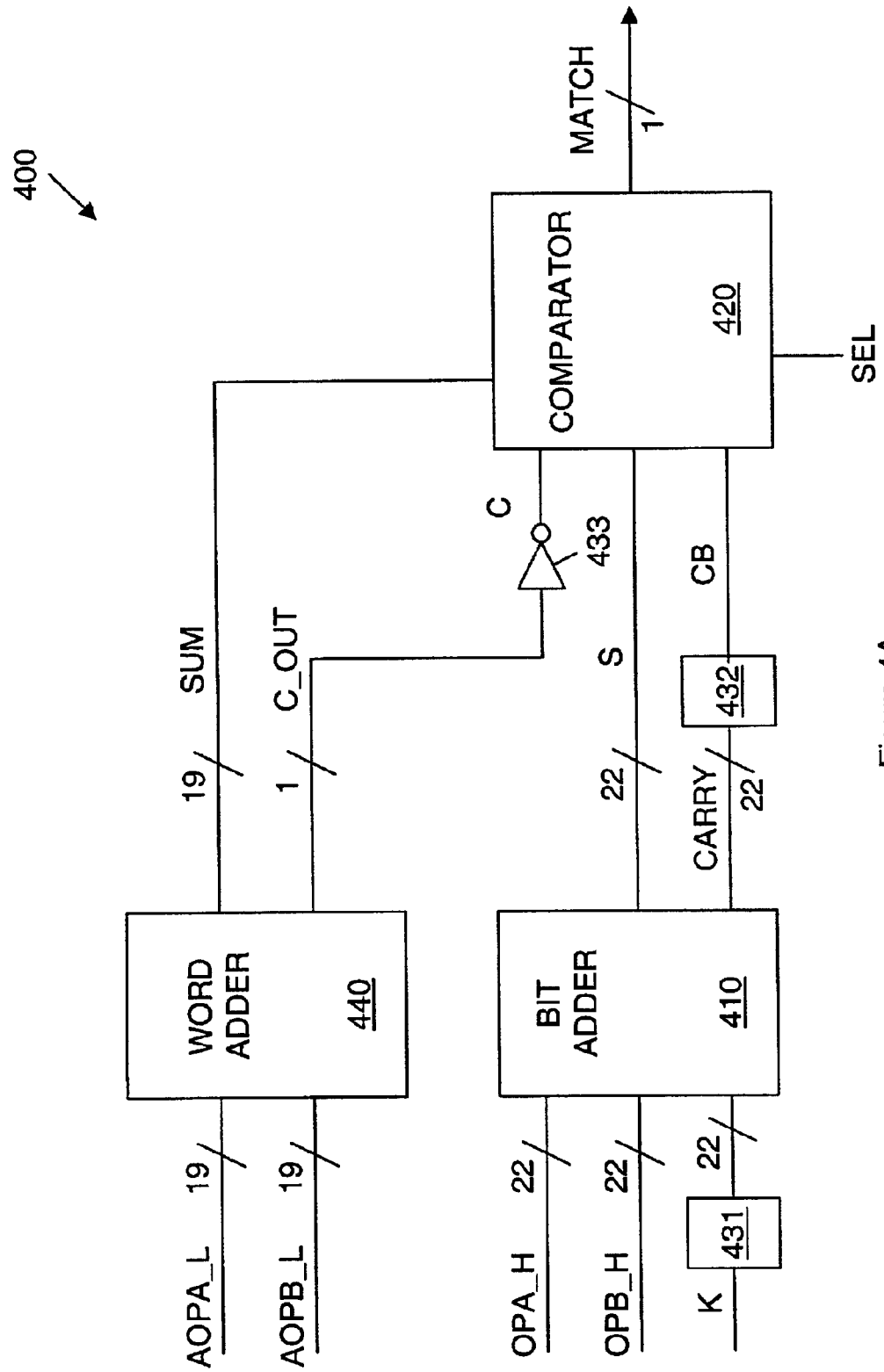
FIG. 4A is a block diagram of a compare system in accordance with another embodiment of the present invention.

FIG. 4A is a block diagram of a compare system 400 in accordance with an embodiment of the present invention. Compare system 400 is configured for 32 bit addresses and a variable page size of 1K, 4K, 16K or 64K. One skilled in the art may easily adapt this embodiment to other ranges of address size and page size. Bit adder 410 receives an operand portion OPA_H, an operand portion OPB_H, and the logical NOT of a pre-stored virtual page number K through inverter 431. The length of K is implemented in the hardware to be the maximum possible virtual page number. In this case, the maximum possible virtual page number is for a 1K page size (210), which leaves 32 bits (address size) less 10 bits (1K page size), or 22 bits. Operand portions OPA_H and OPB_H are the most significant 22 bits of operands OPA and OPB, respectively, for similar reasons. Bit adder 410 provides a 22 bit bitwise concatenated sum S and a 22 bit bitwise concatenated carry CARRY. The logical NOT of bitwise concatenated carry CARRY, bitwise concatenated carry CB, is formed using bitwise inverter 432.

Word adder 440 receives an augmented operand portion AOPA_L and an augmented operand portion AOPB_L. In this example, augmented operand portion AOPA_L is a 19 bit number which is formed from the 16 least significant bits of operand OPA augmented with three logic "1" indicator bit values in the following manner:

OPA[15:14],1,OPA[13:12],1,OPA[11:10],1,OPA[9:0]

For example, the $18^{th}$ bit of augmented operand AOPA_L is equal to the $15^{th}$ bit of operand OPA, the $16^{th}$ bit of augmented operand AOPA_L is equal to a logic "1" indicator bit value, and the $14^{th}$ bit of augmented operand AOPA_L is equal to the $12^{th}$ bit of operand OPA. Similarly, augmented operand portion AOPB_L is a 19 bit number which is formed from the 16 least significant bits of operand OPB augmented with three logic "0" indicator bit values in the following manner:

OPB[15:14],0,OPB[13:12],0,OPB[11:10],0,OPB[9:0]

For example, the $16^{th}$ bit of augmented operand AOPB_L is equal to a logic "0" indicator bit value, the $11^{th}$ bit of augmented operand AOPB_L is equal to the $10^{th}$ bit of operand OPB, and the $0^{th}$ bit of augmented operand AOPB_L is equal to the $0^{th}$ indicator bit bit of operand OPB.

Word adder 440 adds together augmented operands AOPA_L and AOPB_L, producing a 19 bit augmented wordwise sum SUM and a one bit wordwise carry C_OUT. Wordwise carry C_OUT is inverted by inverter 433. Comparator 420 receives a select signal SEL that indicates the length of the page size. The select signal SEL is used to choose among the indicator bits from wordwise sum SUM and to compare that chosen indicator bit to the proper bit of bitwise concatenated sum S. Comparator 420 receives bitwise concatenated carry CB from inverter 432, bitwise concatenated sum S from bit adder 410, augmented wordwise sum SUM from word adder 440, the carry CB from inverter 433, and the select signal SEL, producing a match bit MATCH. If match MATCH has a logic "1" value, then the sum of operands OPA and OPB matches pre-stored virtual page number K. If match bit MATCH has a logic "0" value, then the virtual page number formed from the sum of the virtual page number from the operands OPA and OPB does not match pre-stored virtual page number K. This operation is described in more detail below.

Figure 4B:
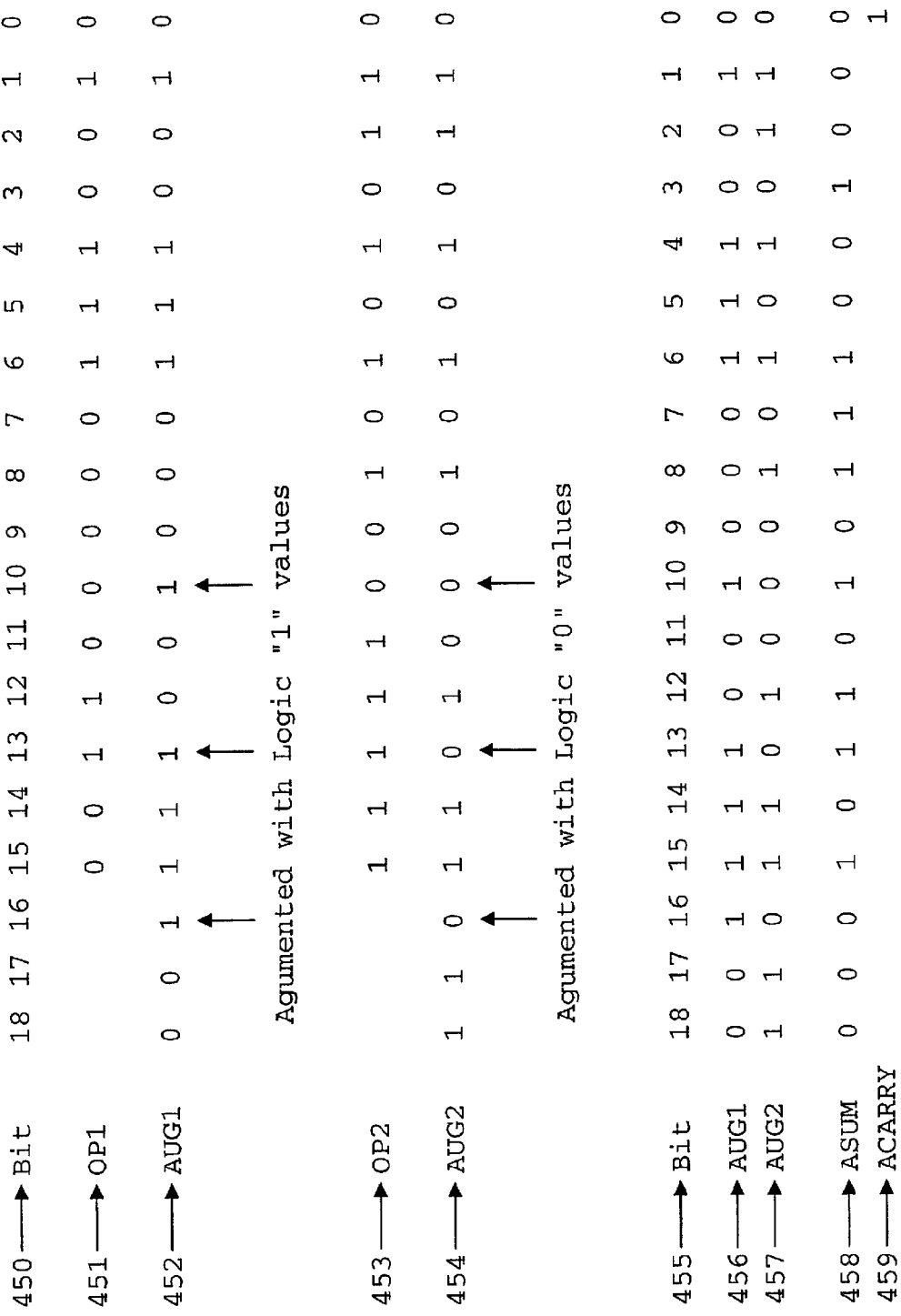
FIG. 4B is an example of an augmentation and the wordwise addition of two operands OP1 and OP2 in accordance with an embodiment of the present invention.

FIG. 4B is an example of an augmentation and then addition of two numbers (operand portions) OP1 and OP2 producing a wordwise sum ASUM and a wordwise carry bit ACARRY. Augmented numbers AUG1 and AUG2 are generated from operand portions OP1 and OP2, respectively, similar to augmented operand portions AOPA_L and AOPB_L. The bit positions of the numbers used in the calculation are labeled on line 450. The bit values of operand portion OP1 are shown on line 451, each bit value corresponding to a bit position on line 450. These bit values are augmented with logic "1" values at bit positions AUG1[16], AUG[13], and AUG1[10] as shown on line 452. The bit values of operand portion OP2 are shown on line 453, each bit value corresponding to a bit position on line 450. These values are augmented with logic "0" values at bit positions AUG2[16], AUG2[13], and AUG2[10] as shown on line 454. The bit positions (line 450), augmented operand portion AUG1 (line 452), and augmented operand portion AUG2 (line 454) are reproduced on lines 455, 456, and 457, respectively. The wordwise sum (i.e. the true sum) of augmented operand portions AUG1 and AUG2 is shown as wordwise sum ASUM on line 458 and the wordwise carry bit ACARRY shown on line 459. The wordwise sum of augmented operand portions AUG1[9:0] and AUG2[9:0] produces no carry bit. As a result, the bit in bit position 10 has a logic "1" value. Similarly, the word sum of augmented operand portions AUG1[12:0] and AUG2[12:0] produces no carry bit. Therefore, the bit in bit position 13 has a logic "1" value. In contrast, the word sum of augmented operand portions AUG1[15:0] and AUG2[15:0] does produce a carry bit. As a result, the bit in bit position 16 has a logic "0" value. The value stored in bit positions 10, 13, and 16 (i.e. the indicator bits) are used to indicate the carry from the less significant bits of operands OP1 and OP2 in comparator 420. Comparator 420 is described in more detail below.

Figure 5:
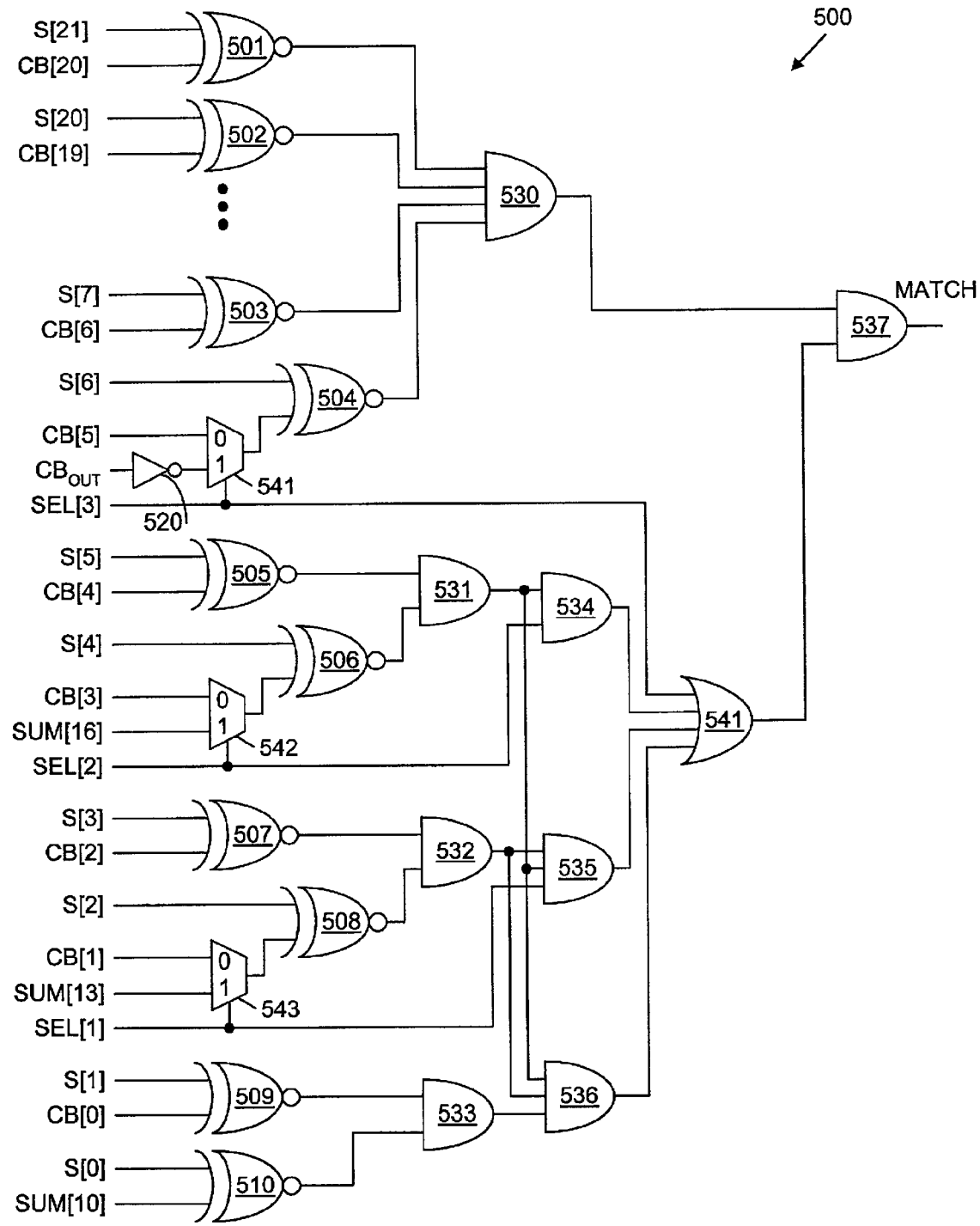
FIG. 5 is a schematic diagram of a comparator in accordance with one embodiment of the present invention.

FIG. 5 is a schematic diagram of a comparator 500 in accordance with one embodiment of the present invention. Each bit in bitwise concatenated sum S is compared to a corresponding carry bit, either in bitwise concatenated carry CB, in wordwise carry C, or an indicator bit in wordwise sum SUM as described in Equations 6, 7, and 12 above. This is accomplished with the use of a two input XNOR gate (an inverted output exclusive-OR), which produces a logic "1" value when the two applied values match. Thus, comparator 500 utilizes XNOR gates 501–510 (and additional XNOR gates, not shown) to each compare two bits. For example, XNOR gate 501 compares a bit of bitwise concatenated sum S (S[21]) to a bit of bitwise concatenated carry CB (CB[20]) and produces a logic "1" value if bit S[21] matches bit CB[20]. The most significant 15 bits of bitwise concatenated sum S (i.e. bits S[21:7]) and the corresponding bits of bitwise concatenated carry CB (i.e. bits CB[20:6]) are similarly compared using an XNOR gate, because these bits remain a part of the comparison operation for all page sizes in the present embodiment. The output terminals of XNOR gates 501–504 (as well as the XNOR gates not shown) are coupled to input terminals of AND gate 530. The output terminal of AND gate 530 is coupled to a first input terminal of AND gate 537. AND gate 537 provides a logic "1" value match bit MATCH if the sum of the operands OPA and OPB (FIG. 3A) match the pre-stored virtual page number K, and provides a logic "0" value match bit MATCH otherwise.

When the page size is chosen to be 64K, then the bits of interest to the virtual page number comparison are the most significant 16 bits of the bitwise concatenated sum bit S, bitwise concatenated carry bit CB, and wordwise carry bit C. If the chosen page size is 64K, XNOR gate 504 compares the wordwise carry bit C to bitwise concatenated sum bit S[6]. However, if the chosen page size is smaller than 64K (e.g. 16K), then XNOR gate 504 compares the bitwise concatenated carry bit CB[5] to bitwise concatenated sum bit S[6]. As a result, bitwise concatenated carry bit CB[5] and wordwise carry bit C are applied to the input data terminals of a multiplexer 541 using a selector bit SEL[3] applied to a control terminal of multiplexer 541. As a result, one of bitwise concatenated carry bit CB[5] and wordwise carry C are applied to an input terminal of XNOR gate 504 along with bitwise concatenated sum bit S[6]. Selector bit SEL[3] has a logic "1" value when the chosen page size is 64K, passing wordwise carry bit C to XNOR gate 504. This logic "1" value of selector bit SEL[3] is also applied to OR gate 541, causing a logic "1" value to be applied at a second input terminal of AND gate 537. As a result, when selector bit SEL[3] has a logic "1" value, if bitwise concatenated sum bits S[21:7] match bitwise concatenated carry bits CB[20:6] and bitwise concatenated sum bit S[6] matches wordwise carry bit C, then AND gate 537 provides a logic "1" match value MATCH.

If the chosen page size is 16K or smaller, then XNOR gate 505 compares bitwise concatenated sum bit S[5] to bitwise concatenated carry bit CB[4]. Additionally, XNOR gate 506 compares either bitwise concatenated carry bit CB[3] or indicator bit SUM[16] to bitwise concatenated sum bit S[6]. The output terminals of XNOR gates 505 and 506 are coupled to input terminals of AND gate 531, which has an output terminal coupled to a first input terminal of AND gate 534. A logic "1" value of selector bit SEL[2] applied to the control input terminal of multiplexer 542 causes indicator bit SUM[16] to be compared to bitwise concatenated carry bit CB[3].

If the chosen page size is 16K, then XNOR gate 506 compares indicator bit ASUM[16] to bitwise concatenated sum bit S[6]. However, if the chosen page size is smaller than 16K (e.g. 4K and selector bit SEL[2] has a logic "0" value), then XNOR gate 506 compares bitwise concatenated carry bit CB[3] to bitwise concatenated sum bit S[4]. As described above, bitwise concatenated carry bit CB[3] and augmented sum carry bit SUM[16] are applied to input data terminals of a multiplexer 542 using the selector bit SEL[2] applied to the control terminal of multiplexer 542. Selector bit SEL[2] has a logic "1" value when the chosen page size is 16K, passing indicator bit SUM[16] to XNOR gate 506. This logic "1" value of selector bit SEL[2] is also applied to a first input terminal of AND gate 534, causing the value provided at the output terminal of AND gate 531 to pass through AND gate 534 to a second input terminal of OR gate 541. As a result, if bitwise concatenated sum bits S[21:5] match bitwise concatenated carry bits CB[20:4] and bitwise concatenated sum bit S[4] matches indicator bit SUM[16], then AND gate 537 provides a logic "1" match value bit MATCH. The 1K and 4K page sizes are similarly calculated. An embodiment similar to that described with respect to FIG. 5 is shown in Appendix I. In the various embodiments of this invention, novel structures and methods have been described to speed comparison of virtual page numbers in MMUs as well as to speed variable-sized number comparison. Using a comparator in place of large adder in accordance with an embodiment of the present invention, the delay of a serial bit adder can be avoided by performing a bit by bit comparison utilizing a mathematical relationship between matching words. Additionally, utilizing a smaller word adder and an augmented portion of applied words in accordance with another embodiment of the present invention, comparison speed may be improved while accommodating variably sized input words. The various embodiments of the structures and methods of this invention that are described above are illustrative only of the principles of this invention and are not intended to limit the scope of the invention to the particular embodiments described. For example, in view of this disclosure, those skilled in the art can define other page sizes, address sizes, component implementations, contexts, and so forth, and use these alternative features to create a method or system according to the principles of this invention. Thus, the invention is limited only by the following claims.

What is claimed is:

1. A comparison circuit for a memory management unit (MMU) comprising:
    a bit adder configured to provide a bitwise sum and a bitwise carry using a first operand portion, a second operand portion, and a comparison value; and
    a comparator configured to receive the bitwise sum and a bitwise inverse of the bitwise carry and configured to provide a match value,
wherein the match value has a first logic value when a wordwise sum of the first operand portion and the second operand portion matches the comparison value, and a second logic value otherwise.

2. The comparison circuit of claim 1, wherein the comparison value is a bitwise inverse of a pre-stored virtual page number (VPN).

3. The comparison circuit of claim 1, wherein the first operand portion includes an entire first operand and the second operand portion includes an entire second operand.

4. The comparison circuit of claim 1, wherein a sum of the first operand portion and the second operand portion is an applied virtual page number.

5. The comparison circuit of claim 4, further comprising a table lookaside buffer (TLB), wherein a logic "1" match value causes a physical page number (PPN) corresponding to the pre-stored virtual page number stored in the TLB to replace the applied virtual page number.

6. The comparison circuit of claim 1, wherein the first operand portion includes a most significant bit portion of a first operand and the second operand portion includes a most significant bit portion of a second operand.

7. The comparison circuit of claim 6, wherein the most significant bit portion is the size of a virtual page number.

8. The comparison circuit of claim 7, further comprising a word adder configured to receive a least significant portion of the first operand and a least significant portion of the second operand, and configured to provide a wordwise sum and a wordwise carry.

9. The comparison circuit of claim 8, wherein the size of the virtual page number is fixed.

10. The comparison circuit of claim 9, the comparator further configured to receive the wordwise carry, wherein a least significant bit of the bitwise sum is compared to the wordwise carry.

11. The comparison circuit of claim 8, wherein the size of the virtual page number is variable.

12. The comparison circuit of claim 11, wherein the least significant portion of the first operand is augmented to include one or more indicator bits having a first logic value and the least significant portion of the second operand is augmented to include one or more indicator bits having a second logic value, such that the wordwise sum also includes one or more indicator bits.

13. The comparison circuit of claim 12, the comparator further configured to receive the wordwise carry, the wordwise sum, and a selector signal, wherein the selector signal corresponds to the size of the virtual page number and selects between indicator bits and the wordwise carry such that a least significant bit of the bitwise sum is compared to one of the indicator bits or the wordwise carry.

14. The comparison circuit of claim 12, further comprising:
an augmentor circuit configured to insert a plurality of indicator bits into the least significant portion of the first operand and a plurality of indicator bits into the least significant portion of the second operand.

15. A comparison circuit comprising:
a bit adder configured to provide a bitwise sum and a bitwise carry using a most significant portion of a first operand, a most significant portion of a second operand, and an inverse of a pre-stored number;
an augmentor configured to insert one or more indicator bits into a least significant portion of the first operand to form a first augmented operand portion, and configured to insert one or more indicator bits into a least significant portion of the second operand to form a second augmented operand portion;
a word adder configured to provide a wordwise sum and a wordwise carry bit using the first augmented operand portion and the second augmented operand portion, the wordwise sum including resultant indicator bits; and
a comparator configured to provide a match signal using the bitwise sum, the bitwise carry, the resultant indicator bits from the wordwise sum, the wordwise carry, and a selector signal, wherein the selector signal defines a utilized portion of the bitwise sum and the bitwise carry and selects between one of the wordwise carry and the resultant indicator bits for comparison by the comparator.

16. The comparison circuit of claim 15, wherein the inverse of the pre-stored number may have a variable size.

17. The variably-sized comparison circuit of claim 16, wherein the one or more indicator bits of the first augmented operand portion have a first logic value and the one or more indicator bits of the second augmented operand portion have an opposite logic value.

18. The variably-sized comparison circuit of claim 17, wherein the first logic value is a logic "1" value and the opposite logic value is a logic "0" value.

19. The variably-sized comparison circuit of claim 16, wherein a first value of the selector signal defines a page size of 1K.

20. A method for comparing a virtual page numbers (VPNs) to a stored page number, the VPNs having a first component portion and a second component portion, the method comprising:
generating a bitwise sum;
generating a bitwise carry; and
comparing the bitwise sum to the bitwise carry.

21. The method of claim 20, wherein generating the bitwise sum and generating the bitwise carry comprise bitwise adding most significant bits of the first component portion of the virtual page number, most significant bits of the second component portion of the virtual page number, and an inverse of the stored page number.

22. The method of claim 21, wherein the most significant bits comprise all of the bits of the first component portion and all of the bits of the second component portion.

23. The method of claim 20, further comprising:
generating a wordwise sum;
generating a wordwise carry; and
comparing the wordwise carry with the bitwise inverse of the bitwise carry to the bitwise sum.

24. The method of claim 23, wherein generating the wordwise sum and the wordwise carry comprise wordwise adding least significant bits of the first component portion and least significant bits of the second component portion of the virtual page number.

25. The method of claim 24, wherein the least significant bits comprise none of the bits of the first component portion and none of the bits of the second component portion of the virtual page number.

26. The method of claim 24, further comprising setting a match bit to a first logic value if the bitwise sum matches the bitwise inverse of the bitwise carry and the wordwise carry.

27. The method of claim 23, further comprising:
augmenting least significant bits of the first component portion of the virtual page number with one or more indicator bits having a first logic value; and
augmenting least significant bits of the second component portion of the virtual page number with one or more indicator bits having a second logic value, wherein the wordwise sum includes resultant indicator bits.

28. The method of claim 27, further comprising:
utilizing the resultant indicator bits while comparing the bitwise sum to the bitwise inverse of the bitwise carry and the wordwise carry such that a range of sizes of virtual page numbers may be compared.

29. A comparison circuit comprising:
means for providing a bitwise sum and a bitwise carry using a portion of a first operand, a portion of a second operand, and an inverse of a pre-stored number; and
means for comparing the bitwise sum to an inverse of the bitwise carry to generate a match bit.

30. The comparison circuit of claim 29, further comprising means for providing a wordwise sum and a wordwise carry bit using another portion of the first operand portion and another portion of the second operand portion.

31. The comparison circuit of claim 30, further comprising a means for augmenting configured to insert one or more indicator bits into the another portion of the first operand portion and the another portion of the second operand portion.

32. The comparison circuit of claim 31, the wordwise sum including resultant indicator bits.

33. The comparison circuit of claim 32, the means for comparing further accepting a selector signal.

34. The comparison circuit of claim 33, wherein the selector signal defines a utilized portion of the bitwise sum and the bitwise carry and selects between one of the wordwise carry and the resultant indicator bits for comparison by the comparator.

35. The comparison circuit of claim 34, wherein the comparison circuit may have a variable size.

36. The variably-sized comparison circuit of claim 35, wherein a first value of the selector signal defines a page size of 1K.

* * * * *